Aug. 11, 1931.   F. V. DODGE ET AL   1,818,844
ONE-WAY CLUTCH
Filed March 1, 1926
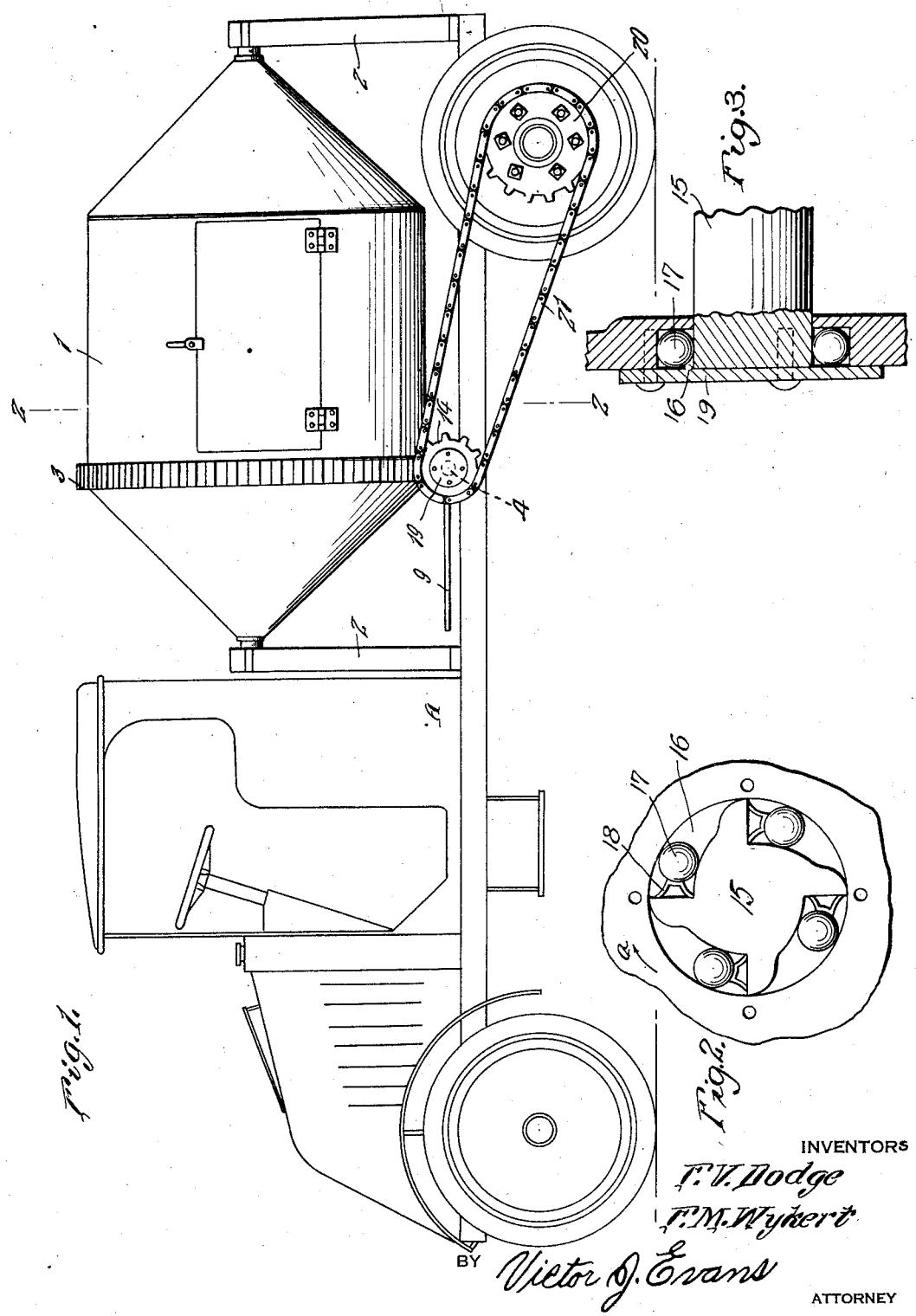
INVENTORS
F. V. Dodge
F. M. Wykert
BY Victor J. Evans
ATTORNEY Patented Aug. 11, 1931

1,818,844

UNITED STATES PATENT OFFICE

FLOYD V. DODGE AND FRANK M. WYKERT, OF GRANT, NEBRASKA, ASSIGNORS OF ONE-THIRD TO ARNEY J. KARRAKER, OF VENANGO, NEBRASKA

ONE-WAY CLUTCH

Application filed March 1, 1926. Serial No. 91,525.

This invention relates to a novel one-way clutch designed primarily for use upon mortar mixers and has as it primary object to provide a clutch which operates automatically to throw out of gear the driving means for the mixer mechanism when the truck, upon which the mixer is mounted, is being backed.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is an elevation of a truck, showing the invention applied thereto.

Figure 2 is a view showing the one way clutch.

Figure 3 is a sectional view through the clutch.

The mixing drum to which motion is to be imparted by the clutch of the invention is indicated by the numeral 1 and is mounted between the uprights 2. A sprocket 14 is mounted on each end of the shaft 4 and we use the clutch shown in Figures 2 and 3 for connecting the sprockets with the shaft. The clutch comprises a cam member 15 connected with each end of the shaft 4 and movable in a circular recess 16 formed in the respective sprocket 14 and balls 17 and springs 18 are arranged in the recesses formed by the cam parts of the member 15. The springs tend to move the balls into the small portions of the recesses so that they will frictionally lock the sprocket to the shaft when the sprocket is being rotated in the direction of the arrow $a$ in Figure 2, but when the sprocket is turned in an opposite direction, the balls will move into the large parts of the recesses and permit free movement of the sprocket on the shaft. A cover plate 19 is fastened to each sprocket and covers the parts within the recess 16.

A sprocket 20 is bolted or otherwise attached to each rear wheel of the truck and a chain 21 passes over each of these sprockets 20 and the respective sprockets 14 so that the shaft 4 will be rotated as the truck travels along.

From the foregoing, it will be seen that the material to be mixed can be placed in the drum and then the truck started for the point where the material is to be used. The clutch parts coact so that the drum will be rotated by the movement of the truck and the drum need not be geared to the truck wheels until the truck reaches a point, the distance from which and the point of destination, is sufficient to enable the drum to make the desired number of revolutions to properly mix the material.

The one way clutch will enable the truck to be backed without moving the drum in a reverse direction and will also facilitate the operation of the parts, as the truck turns a corner or the like.

We desire it to be understood that we may make changes in the construction and in the combination and arrangement of the several parts, provided that such changes fall within the scope of the appended claim.

What we claim is:—

In a one-way clutch, a shaft, a gear rotatable thereon, and having, in one side, a cylindrical recess, the circumferential wall of which is concentric to the shaft and constitutes a clutch face, a clutch head within the recess engaged at one side by the inner wall of the recess, a plate secured to the other side of the gear and engaging the other side of the clutch head, the said clutch head having a peripheral series of cam portions each having a flat side, substantially radial to the axis of the clutch face and an arcuate side opposite the said flat side, the peripheral portions of the clutch head, between the flat side of each cam portion and the arcuate cam portion of the next adjacent cam portion being curved from the inner edge of said flat side, outwardly toward the circumferential wall of the recess in the gear and on an arc eccentric to the said wall, spherical balls arranged in the recess, each between the two adjacent ones of said cam portions, and a leaf spring comprising a concave intermediate portion, of substantially the same curvature as the balls, and diverging side portions extending from the ends of the intermediate portion and engaging against the inner and outer edges of the flat side of the respective cam portion and of a length to hold the respective ball in engagement with the respective arcuate cam portion and the circumferential wall of the recess.

In testimony whereof we affix our signatures.

FLOYD V. DODGE.
FRANK M. WYKERT.